United States Patent [19]

Gray et al.

[11] Patent Number: 5,372,636
[45] Date of Patent: Dec. 13, 1994

[54] FOUNDRY MOLD COMPOSITION, FOUNDRY MOLD MADE THEREFROM AND METHOD FOR PRODUCING THE SAME

[75] Inventors: Steven R. Gray, Highlands Ranch; William J. Miles, Jr., Golden, both of Colo.

[73] Assignee: Bentonite Corporation, Denver, Colo.

[21] Appl. No.: 7,858

[22] Filed: Jan. 22, 1993

[51] Int. Cl.$^5$ .............................. C04B 28/26
[52] U.S. Cl. .................... 106/38.3; 106/38.9
[58] Field of Search ............ 106/38.3, 38.9; 501/141; 164/528, 529

[56] References Cited

U.S. PATENT DOCUMENTS

| | | | |
|---|---|---|---|
| 2,128,404 | 8/1938 | Dunbeck | 106/38.3 |
| 2,237,593 | 4/1941 | Dunbeck | 106/38.9 |
| 2,389,538 | 11/1945 | Pavlish et al. | 106/38.27 |
| 2,389,541 | 11/1945 | Pavlish et al. | 106/38.27 |
| 2,389,543 | 11/1945 | Pavlish et al. | 106/38.27 |
| 2,694,241 | 11/1954 | Freudenberg | 164/529 |
| 2,997,400 | 8/1961 | Greenewald | 264/220 |
| 3,445,251 | 5/1969 | Nevins | 106/38.3 |
| 4,001,029 | 1/1977 | Cassens, Jr. | 501/125 |
| 4,131,476 | 12/1978 | Melcher et al. | 106/38.35 |
| 4,359,339 | 11/1982 | Van Fisk, Jr. | 106/38 |

FOREIGN PATENT DOCUMENTS 568621 4/1945 United Kingdom .

Primary Examiner—Karl Group
Assistant Examiner—Chris Gallo
Attorney, Agent, or Firm—Finnegan, Henderson, Farabow, Garrett & Dunner

[57] ABSTRACT

A composition for use in producing a foundry mold, a foundry mold of the composition and a method for making the foundry mold from the composition. The composition includes sodium smectite clay and at least one of a metal oxide, hydroxide or salt as a mineral clay component of the composition. This mineral clay component is present in the composition along with water and foundry sand. The metal of the oxide, hydroxide or salt may be aluminum, calcium, iron, potassium, magnesium, boron or zinc. The sodium smectite clay may be at least one of bentonite, hectorite or saponite.

57 Claims, 2 Drawing Sheets

FOUNDRY MOLD COMPOSITION, FOUNDRY MOLD MADE THEREFROM AND METHOD FOR PRODUCING THE SAME

BACKGROUND OF THE INVENTION

1. Brief Description of the Invention

The invention relates to a composition that includes a mineral clay compound for use in producing a foundry mold, a foundry mold made of the composition and a method for producing the foundry mold.

2. Description of the Prior Art

In the casting of molten metals and alloys for various foundry applications, it is customary to employ foundry molds having an internal configuration conforming to the shape of the desired casting. Foundry molds for this purpose are conventionally constructed from compositions that include foundry sand as the major constituent in combination with a mineral clay and water. Supplemental additions including ground bituminous coal, lignite, leonardite, pregelatinized starches, cellulose and other conventional additives may also be present in minor amounts. The foundry mold composition is produced conventionally by introducing foundry sand, water, any supplemental additions and the mineral clay into a mixing apparatus, such as a muller, wherein mixing of these constituents is performed to an extent that the particles of the foundry sand are coated by the mineral clay component. It is also common practice to add the supplemental additives and the mineral clay as a single mixture to the foundry sand and water in a mixing apparatus, such as a muller, wherein the mixing of these constituents is performed to an extent that the particles of the foundry sand are coated with the mineral clay. Thereafter, the composition from the muller is introduced to a flask or confining structure incorporating a pattern configured to correspond to the desired configuration of the metal or alloy casting. The composition is consolidated within the pattern to obtain the required integrity, and then the pattern is removed rendering the foundry mold ready for use in producing a metal or alloy casting.

Conventional foundry mold compositions have a mineral or clay compound that includes sodium bentonite clay or calcium bentonite or mixtures of sodium and calcium bentonite to achieve desired properties in the foundry mold composition. Typically, the calcium bentonite constituent would be present in an amount of 0 to 100 percent by weight of the mineral clay mixture. Other mineral clays constituting the well known plastic fine clays, such as kaolinite and illite, may be added to facilitate binding or coating of the foundry sand particles during the mixing operation.

A significant property or characteristic of foundry mold compositions is "durability"; this is the resistance of the mold and specifically the mineral clay component thereof to thermal degradation at the elevated temperatures encountered during conventional hot metal and alloy casting. Specifically, it is advantageous that the mold composition be resistant to thermal degradation at temperatures ranging from 400° to 1200° F. Mineral clays burn-out or lose their desired properties progressively as temperatures increase within this range. It is advantageous to use mineral clays with improved durability to reduce consumption in use. Sodium bentonite exhibits superior durability compared to calcium bentonite in mold compositions. A second significant property is the "dry strength"; this is defined as the energy required to remove the solidified casting from the mold. In conventional foundry mold compositions that contain blends of sodium bentonite and calcium bentonite, the dry strength property of the mold is enhanced by increased amounts of calcium bentonite which serves to reduce dry strength and facilitates easier removal of the casting from the sand mold. This constituent, however, results in degradation of the durability of the mold. A third significant property is moldability of the mold composition. Moldability is defined as the measurement of apparent cohesion between sand grains of the mold composition. Mold compositions deficient in this property will stick in hoppers, to transfer equipment, and can be detrimental to the entire casting process. Mold compositions containing calcium bentonite as all or part of the mineral clay content exhibit improved moldability, particularly when the water content of the mold composition increases. A fourth significant property, "hot strength," is the ability of the mold composition to maintain its integrity at the mold composition/molten metal interface during and following pouring of the metal, usually at temperatures of 1500° F. and above. All of the additional, desired foundry mold properties are attributable to equally by sodium bentonite or calcium bentonite or are enhanced by sodium bentonite in the mold composition. These properties include "green strength" which is the strength or integrity of the mold prior to pouring of the molten metal into the mold. "Wet tensile strength" is the resistance of the mold to degradation due to transient shocks or jolts. "Hot deformation" is the ability of the mold to maintain dimensional stability during hot metal casting so that required dimensional tolerances are achieved with respect to the solidified casting.

Since improved dry strength and improved flowability of the mold composition is enhanced by the presence of calcium bentonite, conventionally, this constituent has been considered to be essential even though it results in degradation of the durability of the mold. Hence, with conventional foundry mold compositions it has not been possible heretofore to achieve an optimum combination of durability and dry strength, along with optimization of the other foundry mold properties discussed above and resulting from increased amounts of sodium bentonite in relation to calcium bentonite.

OBJECTS OF THE INVENTION

It is accordingly an object of the invention to provide a foundry mold composition that achieves an optimum combination of durability and dry strength along with optimum additional desired properties dependent upon the increased presence of sodium bentonite.

An additional object of the invention is to achieve this desirable combination of properties without requiring the presence of calcium bentonite.

Yet another object of the invention is to provide a foundry mold having a mineral clay component and a method of producing the same that results in a foundry mold having an optimum combination of durability and dry strength, along with additional optimum foundry mold properties dependent on the increased presence of sodium bentonite relative to calcium bentonite.

SUMMARY OF THE INVENTION

The invention relates to a composition for use in producing a foundry mold comprising a mineral clay component that includes sodium smectite clay and 0.1 to 5 wt % of at least one of a metal oxide, hydroxide or salt. The mineral clay component is present in the composition in an amount of 3 to 12 wt % along with 1.5 to 6 wt % water and the balance foundry sand and possibly supplemental additions.

The at least one of the metal oxide, hydroxide or salt may preferably be present within the range of 0.5 to 5 wt % and more preferably 0.5 to 2.5 wt %.

The mineral clay component may preferably be present within the range of 4 to 10 and more preferably 4 to 8 wt %.

The water may preferably be present within the range of 2 to 4 wt %.

The metal oxide, hydroxide or salt may be of the metals aluminum, calcium, iron, potassium, magnesium, boron or zinc, with magnesium, calcium, aluminum or boron being preferred.

The sodium smectite clay may be at least one of bentonite, hectorite or saponite, with bentonite being preferred.

It is preferred that the foundry mold composition, in accordance with the invention, exhibit minimum foundry properties of 70% durability index, foundry sand properties of 55 psi maximum dry strength, 200 psi minimum hot strength, 15 g./sq. cm. minimum wet tensile strength, 0.0104 to 0.0209 in./in. hot deformation, 1.84 to 2.17% green deformation, and improved moldability in a controlled laboratory environment where green strength, dry strength, and moldability are measured per AFS (American Foundry Society) procedures 202-87-S, 203-87-S, and 227-87-S, where hot compressive strength, wet (green) tensile strength, hot deformation, and green deformation are measured per AFS procedures 234-87-S, 204-87-S, 235-87-S, and 321-87-S in a sand mixture evaluated per the procedure described in Table 3 where the mineral clay contains at least one of the metal oxide, hydroxide or salt within the range of 0.5 to 2.5 wt%. The dry strength is evaluated using ASF procedure 203-87-S. These procedures are referenced in the AFS Mold and Core Handbook, Volume 2, Copyright 1989. The durability profile of the mineral clay is determined at 200° F., 400° F., 600° F., 800° F., 1000° F. and 1200° F. by heating the mineral clay at each temperature increment for two hours, followed by determination of active clay by AFS procedure 210-89-S. The durability index is defined by determining the average active clay for the six temperatures, with respect to the active clay content at 200° F. The individual character of a foundry mold composition is dependent upon many variables found within each foundry. Specific values will vary from one foundry to another. The procedures described herein represent a controlled basis for determining these properties.

The compositions of the invention find utility in the production of a foundry mold.

A foundry mold is produced in accordance with the invention by mixing and coating a foundry sand with a mineral clay component and supplemental additions when desired in the presence of water to form a foundry mold composition. The foundry mold composition is introduced into a flask containing a pattern defining the foundry mold. The composition is consolidated within the flask to form the foundry mold therein. The pattern is removed from the foundry mold to expose the mold. In accordance with this method of the invention, the foundry mold composition may be those in accordance with the invention and within the limits thereof, as set forth above.

DETAILED DESCRIPTION OF THE PREFERRED EMBODIMENTS

Figure 1A:
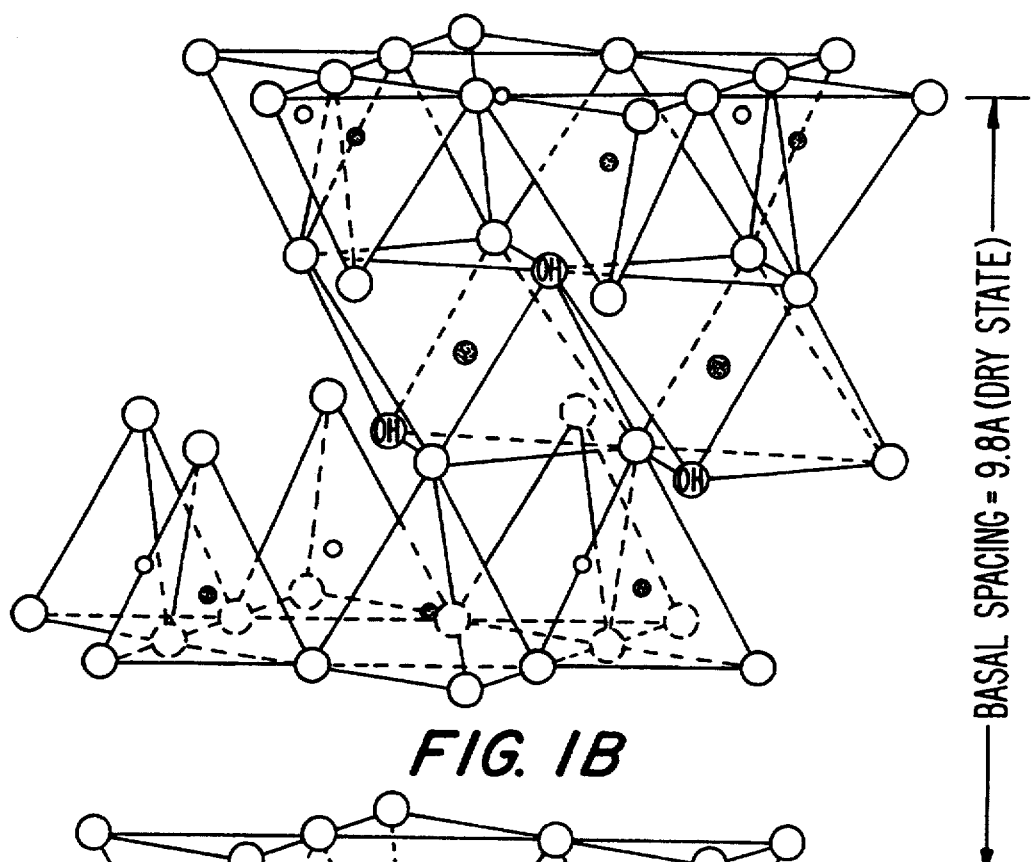
FIG. 1 is a model of the crystal lattice structure of a single, three-layer plate structure characteristic of sodium bentonite.
Figure 1B:
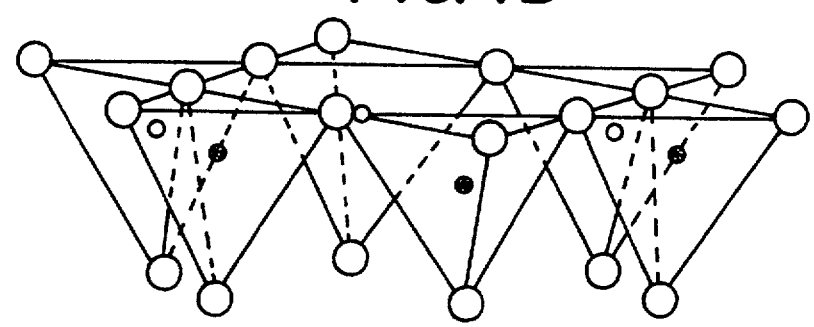

With reference to the drawings, and for the present to FIG. 1 thereof, there is shown the conventional crystal lattice structure characteristic of sodium bentonite. Sodium bentonite consists of about 70 to 95% montmorillonite, with the balance being various residual constituents, such as quartz, opal, cristobalite, feldspar, biotite, clinoptilite, calcite and the like. Sodium bentonite is a species of sodium-containing smectite clay that contains in addition to sodium, the components magnesium, aluminum and silica. Additional species of smectite clay are hectorite and saponite; these species in addition to bentonite naturally occur in quantities that are sufficient to render them economically practical for use in the production of foundry mold compositions. The additional species nontronite, beidellite, sauconite are not presently commercially practical, although they would be suitable for use in the practice of the invention for achieving the desired combination of foundry mold properties as discussed above. Any smectite clay species, such as bentonite, used in the practice of the invention may be employed with the normal residual constituents or in the case of bentonite with the constituents substantially removed with only montmorillonite being present. Consequently, the terms "sodium-containing smectite clay" and "sodium bentonite" include these clays with the normal residual constituents either being present or removed.

The crystal structure of smectite clay species, including bentonite, constitute a three-layer sheet structure, as shown in FIG. 1. The upper and lower layers of the plate, as shown in FIG. 1, are silica with the middle plate being a metal layer of at least two of the metals aluminum, iron, lithium, manganese and magnesium. The interlayer space contains sodium or calcium. The morphology of any species of smectite clay constitutes a stacked plate structure of the three-layer plates shown in FIG. 1.

This three-layer plate structure is critical for the purposes of the invention in that it permits delamination and dispersion of the smectite clay during mixing and reaction thereof with water and foundry sand to permit substantially complete reaction of the smectite clay with the metal oxide, hydroxide or salt to in turn achieve the desired combination of foundry mold properties. Specifically, as discussed above, the presence of the metal oxide, hydroxide or salt and the reaction thereof with the smectite clay achieves the desired combination of optimum durability and dry strength, along with the other properties attributable to the presence of sodium containing smectite clay in the absence of calcium-containing smectite clay, specifically in the absence of calcium bentonite. This reaction improves the dry strength of the composition as is conventionally achieved with the presence of calcium-containing smectite clay without degrading the durability achieved by the presence of sodium-containing smectite clay along with the other desirable foundry properties attributable to the presence of sodium-containing smectite clay.

The delaminating and dispersion characteristics necessary to permit reaction with the metal oxide, hydroxide or salt component is characteristic of sodium containing smectite clays. Consequently, the specific examples of the invention constituting the experimental work conducted with bentonite, as presented hereinafter, demonstrate the operability of the other sodium-containing smectite clay species.

pounds listed in Table 1 in the indicated amounts. These additional compounds were added to the sodium bentonite in amounts ranging from 0.5 to 5 wt %. Foundry mold properties reported in Table 1 reflect a dry component mixture of 5% bentonite containing 0.1 to 5 wt % of at least one metal oxide, hydroxide or salt and 95% AFS 50-70 testing sand. The sand and bentonite mixture is mixed with sufficient water to achieve a mixture moisture content listed in Table 1.

Table 2 lists the values for hot strength, hot deforma-

TABLE 1

CHEMICAL ADDITIVES TO SODIUM BENTONITE THAT AFFECT DRY STRENGTH OF FOUNDRY SAND SYSTEMS RELATIVE TO CALCIUM BENTONITE THE OTHER DESIRABLE PROPERTIES OF SODIUM BENTONITE COMPOSITIONS LISTED

| Chemical Additive | Concentration in Bentonite | Dry Strength psi | Green Strength psi | Compactibility % | Permeability Number | Moldability Index % | Friability Index % | Durability Index | Temper Water % |
|---|---|---|---|---|---|---|---|---|---|
| Na bentonite | Not applicable | 99 | 6.8 | 60 | 200 | 6.6 | 6.0 | 76.1% | 2.48 |
| Ca bentonite | Not applicable | 55 | 7.3 | 60 | 197 | 16.3 | 7.7 | 63.9% | 2.47 |
| Al(OH)$_3$ | 2% | 33 | 7.1 | 61 | 213 | 10 | 5.8 | 75.9% | 2.52 |
| Al$_2$O$_3$ | 2% | 68 | 5.8 | 61 | 211 | 6 | 5.4 | | 2.42 |
| Al$_2$(SO$_4$)$_3$.16 H$_2$O | 2% | 45 | 7.4 | 62 | 225 | 12 | 5.7 | 76.3% | 2.51 |
| AlK(SO$_4$)$_2$.12 H$_2$O | 2% | 56 | 6.7 | 61 | 225 | 8.8 | 7.0 | 72.3% | 2.52 |
| BaCl$_2$ | 2% | 73 | 5.8 | 61 | 220 | 7.7 | 5.8 | | 2.53 |
| Ba(OH)$_2$.8 H$_2$O | 2% | 75 | 6.9 | 61 | 219 | 8.2 | 5.7 | | 2.47 |
| BaO | 2% | 73 | 8.4 | 62 | 209 | 11 | 5.7 | | 2.53 |
| B(OH)$_3$ | 2% | 68 | 7.5 | 62 | 220 | 16 | 6.9 | | 2.47 |
| Na$_4$B$_4$O$_7$.10 H$_2$O | 4% | 35 | 9.6 | 58 | 204 | 22 | 7.9 | 78.4% | 2.51 |
| CaCl$_2$ | 2% | 55 | 6.0 | 59 | 222 | 12 | 7.8 | 79.2% | 2.48 |
| Ca(OH)$_2$ | 2% | 43 | 9.9 | 60 | 211 | 32 | 5.3 | 75.3% | 2.43 |
| CaO | 2% | 15.6 | 12.0 | 50 | 187 | 88 | 9.7 | 77.8% | 2.46 |
| FeCl$_2$.4 H$_2$O | 2% | 46 | 6.6 | 61 | 227 | 8.3 | 5.9 | 76.5% | 2.55 |
| FeCl$_3$.6 H$_2$O | 2% | 41 | 5.5 | 60 | 228 | 4.9 | 5.6 | 76.2% | 2.53 |
| LiOH.H$_2$O | 2% | 93 | 7.2 | 63 | 210 | 8.1 | 5.2 | | 2.54 |
| NaOH | 2% | 61 | 6.8 | 62 | 215 | 12 | 5.2 | | 2.49 |
| KOH | 2% | 49 | 6.7 | 62 | 211 | 11 | 6.6 | | 2.50 |
| Mg(OH)$_2$ | 2% | 64 | 6.5 | 60 | 223 | 9.3 | 6.6 | 81.7% | 2.45 |
| MgO | 2% | 26 | 9.5 | 60 | 226 | 32 | 7.5 | 78.1% | 2.44 |
| MgSO$_4$.7 H$_2$O | 2% | 76 | 5.9 | 61 | 219 | 5.9 | 6.0 | | 2.51 |
| ZnCl$_2$ | 2% | 43 | 6.0 | 61 | 226 | 6.5 | 5.8 | 74.0% | 2.52 |
| ZnO | 2% | 60 | 6.4 | 60 | 210 | 11 | 5.7 | | 2.42 |
| 1% MgO + 1% CaO | 2% | 47 | 8.2 | 63 | 219 | 20 | 8.2 | 77.4% | 2.42 |
| 1% MgO + 1% Ca(OH)$_2$ | 2% | 48 | 8.0 | 63 | 219 | 11 | 8.0 | 77.4% | 2.48 |

Table 1 lists the desirable foundry mold properties of molds produced from sodium bentonite, calcium bentonite and sodium bentonite with the additional compounds listed in Table 1 in the indicated amounts.

tion, green deformation and wet tensile strength for respective samples in accordance with the invention.

TABLE 2

FOUNDRY EVALUATION

Laboratory mixes consisting of 6% bentonite and 94% 62 grain fineness foundry sand were evaluated at moisture levels of 2.1% and 2.8%. The mixes were test for green compression strength, dry compression strength, and wet tensile strength. The mixes were also tested for hot compression strength and hot deformation at 1500° F.

Mix Preparation

| | |
|---|---|
| Batch Size, grams: | 8000 |
| Silica Sand (62 GFN), grams: | 7520 |
| Bentonite, grams: | 480 |

The water additions for the individual mixes were as follows:

| Sample | 2.1% Moisture Ml H$_2$O | 2.8% Moisture Ml H$_2$O |
|---|---|---|
| 1 Sodium Bentonite | 140 | 205 |
| 2 Calcium Bentonite | 140 | 200 |
| 3 Sodium Bentonite + 0.5% MgO | 150 | 200 |
| 4 Sodium Bentonite + 1.0% MgO | 140 | 215 |
| 5 Sodium Bentonite + 1.5% MgO | 145 | 200 |
| 6 Sodium Bentonite + 2% Al (OH)$_3$ | 140 | 200 |
| 7 Sodium Bentonite + 2% Al$_2$(SO$_4$)$_3$.16 H$_2$O | 145 | 200 |
| 8 Sodium Bentonite + 2% AlK (SO$_4$)$_2$.12 H$_2$O | 140 | 195 |
| 9 Sodium Bentonite + 2% CaO | 145 | 205 |
| 10 Sodium Bentonite + 2% Ca(OH)$_2$ | 140 | 180 |
| 11 Sodium Bentonite + 2% CaCl$_2$ | 140 | 188 |
| 12 Sodium Bentonite + 2% FeCl$_2$ + 4 H$_2$O | 140 | 192 |
| 13 Sodium Bentonite + 2% FeCl$_3$.6 H$_2$O | 140 | 190 |
| 14 Sodium Bentonite + 2% MgO | 140 | 200 |
| 15 Sodium Bentonite + 1% MgO + 1% CaO | 140 | 202 |
| 16 Sodium Bentonite + 1% MgO + 1% Ca(OH)$_2$ | 140 | 210 |
| 17 Sodium Bentonite + 2% Na$_2$B$_4$O$_7$.10 H$_2$O | 140 | 185 |

TABLE 2-continued

FOUNDRY EVALUATION

| | | |
|---|---|---|
| 18 Sodium Bentonite + 2% ZnCl$_2$ | 140 | 195 |

The mixes were produced in a Simpson 24" lab mixer/muller. The sand and water were mixed for two (2) minutes. The bentonite was then added and mixed for eight (8) minutes prior to sand evaluation. A total of eighteen (18) bentonite samples and thirty-six (36) sand mixes were evaluated.

| | Hot Strength psi | Hot Deformation in/in | Green Deformation % | Wet Tensile Strength g/sq. cm. |
|---|---|---|---|---|
| Sodium Bentonite | 571 | .0195 | 2.29% | 42.6 |
| Calcium Bentonite | 130 | .0104 | 1.89% | 9.5 |
| Na Bentonite   + 0.5% MgO | 428 | .0159 | 2.06% | 40.1 |
| + 1.0% MgO | 465 | .0178 | 2.04% | 34.9 |
| + 1.5% MgO | 352 | .0163 | 1.99% | 33.3 |
| + 2.0% MgO | 265 | .0131 | 1.98% | 38.2 |
| + 2% AL$_2$(SO$_4$)$_3$16H$_2$O | 322 | .0142 | 2.04% | 35.4 |
| + 2% AlK(SO$_4$)$_2$.12H$_2$O | 290 | .0142 | 2.02% | 37.8 |
| + 2% CaO | 96 | .0113 | 1.64% | 10.7 |
| + 2% Ca(OH)$_2$ | 210 | .0130 | 1.95% | 24.4 |
| + 2% CaCl$_2$ | 409 | .0128 | 2.14% | 18.4 |
| + 2% FeCl$_2$.4H$_2$O | 342 | .0144 | 2.12% | 18.3 |
| + 2% FeCl$_3$.6H$_2$O | 344 | .0152 | 2.17% | 21.1 |
| + 2% MgO | 203 | .0148 | 1.90% | 25.4 |
| + 1% MgO + 1% CaO | 396 | .0161 | 2.05% | 34.5 |
| + 1% MgO + 1% Ca(OH)$_2$ | 478 | .0148 | 2.17% | 40.2 |
| + 2% Na$_2$B$_4$O$_7$.10H$_2$O | 514 | .0211 | 1.81% | 31.3 |
| + 2% ZnCl$_2$ | 375 | .0142 | 2.14% | 16.1 |

The foundry molds used for testing were produced by using American Foundrymen's Society procedures as set forth in AFS mold and Core Handbook, Volume 2, copyright 1989.

The data in Table 1 demonstrate that in accordance with the invention, an optimum combination of durability and dry strength may be achieved by a sodium bentonite composition to which the listed additives in accordance with the invention are included without the necessary presence of calcium bentonite.

Figure 2:
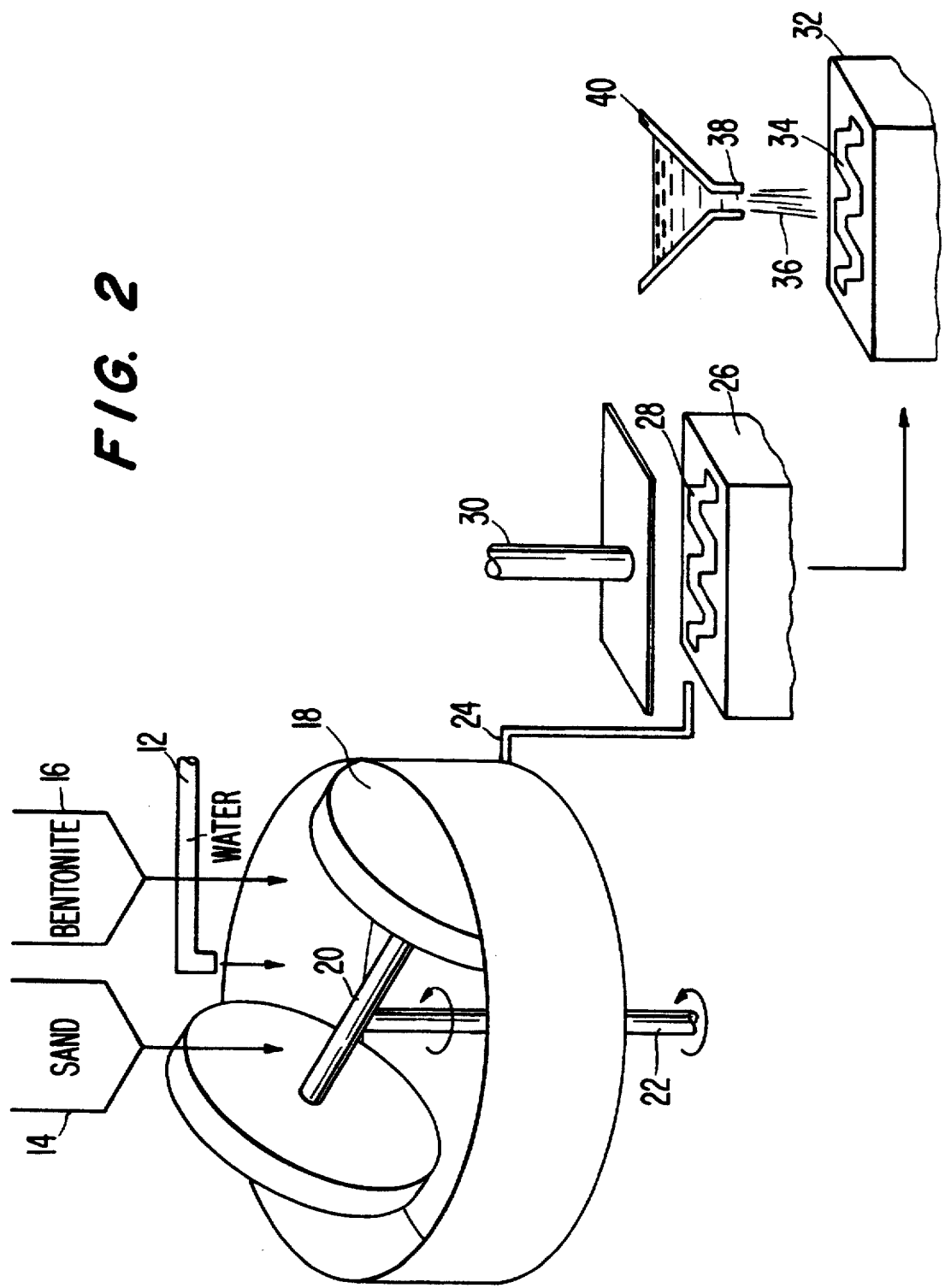
FIG. 2 is a schematic diagram of one embodiment of apparatus suitable for use in the practice of the method of the invention.

With reference to FIG. 2 of the drawings, the apparatus suitable for use in the production of foundry molds includes a conventional muller 10 into which water is introduced from pipe 12, sand is introduced from hopper 14 and sodium bentonite with an addition of a metal oxide, hydroxide or salt in accordance with the invention is introduced from hopper 16. The muller 10 conventionally includes an opposed pair of stone mixing wheels 18 mounted on opposite ends of a shaft 20 that is connected to and rotated by shaft 22 in the direction of the arrows, which shaft 22 is connected in driving engagement with a motor (not shown). The constituents introduced to the muller 10 are mixed by the action of the stone wheels 18 in a manner well known in the art so that the sand particles are coated with the constituent comprising bentonite and a metal oxide, hydroxide or salt and supplemental additives when desired. When this has been achieved, the resulting foundry mold composition is discharged from the muller at 24 and poured into a flask 26 having a pattern 28 configured to define the cavity desired in the foundry mold. A ram 30 is used to compress and consolidate the composition within the flask 26. Thereafter, the pattern 28, is removed to expose the foundry mold 32 having a mold cavity 34. The mold cavity 34 conforms to the configuration desired in the metal casting. Molten metal 36 is introduced to the cavity 34 of the mold through a nozzle 38 of a vessel 40 which may be a conventional ladle or tundish.

What is claimed:

1. A composition for use in producing a foundry mold comprising, a mineral clay component comprising sodium smectite clay and 0.1 to 5 wt % of at least one of a metal oxide, hydroxide or salt, with said mineral clay component being present in the composition in an amount of 3 to 12 wt %, water 1.5 to 6 wt % and balance foundry sand.

2. The composition of claim 1, wherein said at least one of a metal oxide, hydroxide or salt is present within the range of 0.5 to 5 wt %.

3. The composition of claim 1, wherein said at least one of a metal oxide, hydroxide or salt is present within the range of 0.5 to 2.5 wt %.

4. The composition of claims 1, 2 or 3, wherein said mineral clay component is present within the range of 4 to 10 wt %.

5. The composition of claim 4, wherein said water is present within the range of 2 to 4 wt %.

6. A composition for use in producing a foundry mold comprising, a mineral clay component comprising sodium smectite clay and 0.1 to 5 wt % of at least one of a metal oxide, hydroxide or salt being of at least one of the metals aluminum, calcium, iron, potassium, magnesium, boron or zinc, with said mineral clay component being present in the composition in an amount of 3 to 12 wt %, water 1.5 to 6 wt % and balance foundry sand.

7. The composition of claim 6, wherein said at least one of a metal oxide hydroxide or salt being of at least one of the metals aluminum, calcium, iron, potassium, magnesium, boron or zinc, is present within the range of 0.5 to 5 wt %.

8. The composition of claim 6, wherein said at least one of a metal oxide, hydroxide or salt being of at least one of the metals aluminum, calcium, iron, potassium, magnesium, boron or zinc, is present within the range of 0.5 to 2.5 wt %.

9. The composition of claims 6, 7 or 8, wherein said mineral clay component is present within the range of 4 to 10 wt %.

10. The composition of claim 9, wherein said water is present within the range of 2 to 4 wt %.

11. A composition for use in producing a foundry mold comprising, a mineral clay component comprising sodium smectite clay and 0.1 to 5 wt % of at least one of a metal oxide, hydroxide or salt being at least one of the metals magnesium, calcium, aluminum or boron, with said mineral clay component being present in the composition in an amount of 3 to 12 wt %, water 1.5 to 6 wt % and balance foundry sand.

12. The composition of claim 11, wherein said at least one of a metal oxide hydroxide or salt being at least one of the metals magnesium, calcium, aluminum or boron, is present within the range of 0.5 to 5 wt %.

13. The composition of claim 11, wherein said at least one of a metal oxide, hydroxide or salt being at least one of the metals magnesium, calcium, aluminum or boron, is present within the range of 0.5 to 2.5 wt %.

14. The composition of claims 11, 12 or 13, wherein said mineral clay component is present within the range of 4 to 10 wt %.

15. The composition of claim 14, wherein said water is present within the range of 2 to 4 wt %.

16. The composition of claims 1, 2 or 3, wherein said sodium smectite clay is at least one of bentonite, hectorite and saponite.

17. The composition of claims 1, 2 or 3, wherein said smectite clay is bentonite.

18. The composition of claim 16, wherein said composition exhibits minimum foundry mold properties of 70% durability index, 55 psi dry strength, 200 psi hot strength, 15 g./sq. cm. wet tensile strength, 0.0104 to 0.0209 in./in. hot deformation and 1.84 to 2.17% green deformation.

19. The composition of claim 17, wherein said composition exhibits minimum foundry mold properties of 70% durability index, 55 psi dry strength, 200 psi hot strength, 15 g./sq. cm. wet tensile strength, 0.0104 to 0.0209 in./in. hot deformation and 1.84 to 2.17% green deformation.

20. A foundry mold of a composition comprising, a mineral clay component comprising sodium smectite clay and 0.1 to 5 wt % of at least one of a metal oxide, hydroxide or salt, with said mineral clay component being present in the composition in an amount of 3 to 12 wt %, water 1.5 to 6 wt % and balance foundry sand.

21. The foundry mold of claim 20, wherein said at least one of a metal oxide hydroxide or salt is present within the range of 0.5 to 5 wt %.

22. The foundry mold of claim 20, wherein said at least one of a metal oxide, hydroxide or salt is present within the range of 0.5 to 2.5 wt %.

23. The foundry mold of claims 20, 21 or 22, wherein said mineral clay component is present within the range of 4 to 10 wt %.

24. The foundry mold of claim 23, wherein said water is present within the range of 2 to 4 wt %.

25. A foundry mold of a composition comprising, a mineral clay component comprising sodium smectite clay and 0.1 to 5 wt % of at least one of a metal oxide, hydroxide or salt being of at least one of the metals aluminum, calcium, iron, potassium, magnesium, boron or zinc, with said mineral clay component being present in the composition in an amount of 3 to 12 wt %, water 1.5 to 6 wt % and balance foundry sand.

26. The foundry mold of claim 25, wherein said at least one of a metal oxide, hydroxide or salt being of at least one or the metals aluminum, calcium, iron, potassium, magnesium, boron or zinc, is present within the range of 0.5 to 5 wt %.

27. The foundry mold of claim 25, wherein said at least one of a metal oxide, hydroxide or salt being of at least one of the metals aluminum, calcium, iron, potassium, magnesium, boron or zinc, is present within the range of 0.5 to 2.5 wt %.

28. The foundry mold of claims 25, 26 or 27, wherein said mineral clay component is present within the range of 4 to 10 wt %.

29. The foundry mold of claim 28, wherein said water is present within the range of 2 to 4 wt %.

30. A foundry mold of a composition comprising, a mineral clay component comprising sodium smectite clay and 0.1 to 5 wt % of at least one of a metal oxide, hydroxide or salt being at least one of the metals magnesium, calcium, aluminum or boron, with said mineral clay component being present in the composition in an amount of 3 to 12 wt %, water 1.5 to 6 wt % and balance foundry sand.

31. The foundry mold of claim 30, wherein said at least one of a metal oxide, hydroxide or salt being at least one of the metals magnesium, calcium, aluminum or boron, is present within the range of 0.5 to 5 wt %.

32. The foundry mold of claim 30, wherein said at least one of a metal oxide, hydroxide or salt being at least one of the metals magnesium, calcium, aluminum or boron, is present within the range of 0.5 to 2.5 wt %.

33. The foundry mold of claims 30, 31 or 32, wherein said mineral clay component is present within the range of 4 to 10 wt %.

34. The composition of claim 33, wherein said water is present within the range of 2 to 4 wt %.

35. The composition of claims 20, 21 or 22, wherein said sodium smectite clay is at least one of bentonite, hectorite and saponite.

36. The composition of claims 20, 21 or 22, wherein said smectite clay is bentonite.

37. The composition of claim 35, wherein said composition exhibits minimum foundry mold properties of 70% durability index, 55 psi dry strength, 200 psi hot strength, 15 g./sq. cm. wet tensile strength, 0.0104 to 0.0209 in./in. hot deformation and 1.84 to 2.17% green deformation.

38. The composition of claim 36, wherein said composition exhibits minimum foundry mold properties of 70% durability index, 55 psi dry strength, 200 psi hot strength, 15 g./sq. cm. wet tensile strength, 0.0104 to 0.0209 in./in hot deformation and 1.84 to 2.17% green deformation.

39. A method for producing a foundry mold comprising, mixing and coating foundry sand with a mineral clay component in the presence of water to form a foundry mold composition, introducing said foundry mold composition into a pattern defining the foundry mold, consolidating said foundry mold composition within said pattern to form said foundry mold therein and removing said pattern from said foundry mold, wherein said foundry mold composition comprises, a mineral clay component comprising sodium smectite clay and 0.1 to 5 wt % of at least one of a metal oxide, hydroxide or salt, with said mineral clay component being present in the composition in an amount of 3 to 12 wt %, water 1.5 to 6 wt % and balance foundry sand.

40. The method of claim 39, wherein said at least one of a metal oxide hydroxide or salt is present within the range of 0.5 to 5 wt %.

41. The method of claim 39, wherein said at least one of a metal oxide, hydroxide or salt is present within the range of 0.5 to 2.5 wt %.

42. The method of claims 39, 40 or 41, wherein said mineral clay component is present within the range of 4 to 10 wt %.

43. The method of claim 42, wherein said water is present within the range of 2 to 4 wt %.

44. A method for use in producing a foundry mold comprising, a mineral clay component comprising sodium smectite clay and 0.1 to 5 wt % of at least one of a metal oxide, hydroxide or salt being of at least one or the metals aluminum, calcium, iron, potassium, magnesium, boron or zinc, with said mineral clay component being present in the composition in an amount of 3 to 12 wt %, water 1.5 to 5 wt % and balance foundry sand.

45. The method of claim 44, wherein said at least one of a metal oxide, hydroxide or salt being of at least one or the metals aluminum, calcium, iron, potassium, magnesium, boron or zinc, is present within the range of 0.5 to 5 wt %.

46. The method of claim 44, wherein said at least one of a metal oxide, hydroxide or salt being of at least one or the metals aluminum, calcium, iron, potassium, magnesium, boron or zinc, is present within the range of 0.5 to 2.5 wt %.

47. The method of claims 44, 45 or 46, wherein said mineral clay component is present within the range of 4 to 10 wt %.

48. The method of claim 47, wherein said water is present within the range of 2 to 4 wt %.

49. A method for use in producing a foundry mold comprising, a mineral clay component comprising sodium smectite clay and 0.1 to 5 wt % of at least one of a metal oxide, hydroxide or salt being at least one of the metals magnesium, calcium, aluminum or boron, with said mineral clay component being present in the composition in an amount of 3 to 12 wt %, water 1.5 to 6 wt % and balance foundry sand.

50. The method of claim 49, wherein said at least one of a metal oxide, hydroxide or salt being at least one of the metals magnesium, calcium, aluminum or boron, is present within the range of 0.5 to 5 wt %.

51. The method of claim 49, wherein said at least one of a metal oxide, hydroxide or salt being at least one of the metals magnesium, calcium, aluminum or boron, is present within the range of 0.5 to 2.5 wt %.

52. The method of claims 49, 50 or 51, wherein said mineral clay component is present within the range of 4 to 10 wt %.

53. The method of claim 52, wherein said water is present within the range of 2 to 4 wt %.

54. The method of claims 40, 41 or 42, wherein said sodium smectite clay is at least one of bentonite, hectorite and saponite.

55. The method of claims 40, 41 or 42, wherein said smectite clay is bentonite.

56. The method of claim 54, wherein said composition exhibits minimum foundry mold properties of 70% durability index, 55 psi dry strength, 200 psi hot strength, 15 g./sq. cm. wet tensile strength, 0.0104 to 0.0209 in./in. hot deformation and 1.84 to 2.17% green deformation.

57. The method of claim 55, wherein said composition exhibits minimum foundry mold properties of 70% durability index, 55 psi dry strength, 200 psi hot strength, 15 g./sq. cm. wet tensile strength, 0.0104 to 0.0209 in./in. hot deformation and 1.84 to 2.17% green deformation.

* * * * *

UNITED STATES PATENT AND TRADEMARK OFFICE
CERTIFICATE OF CORRECTION

PATENT NO. : 5,372,636
DATED : December 13, 1994
INVENTOR(S) : Steven R. Gray et al.

It is certified that error appears in the above-indentified patent and that said Letters Patent is hereby corrected as shown below:

Column 5:
In Table 1, in the second column, under the heading "Concentration in Bentonite", sixth row, after "$AlK(SO_2)_2 \cdot 12H_2O$", "2%" should read --4%--.

Column 5:
In Table 1, in the first column, under the heading "Chemical Additive", eleventh line from the top, "$Na_4B_4O_7 \cdot 10H_2O$" should read --$Na_2B_4O_7 \cdot 10H_2O$--.

Column 6:
In Table 2, second line of text below the heading "FOUNDRY EVALUATION", "tesu" should read --tested-- .

Signed and Sealed this

Fourteenth Day of March, 1995

Attest:

BRUCE LEHMAN

*Attesting Officer*  *Commissioner of Patents and Trademarks*